(12) United States Patent
Iyengar et al.

(10) Patent No.: US 6,721,737 B2
(45) Date of Patent: Apr. 13, 2004

(54) METHOD OF RANKING ITEMS USING EFFICIENT QUERIES

(75) Inventors: Vijay S. Iyengar, Cortlandt Manor, NY (US); Jonathan Lee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 09/826,242

(22) Filed: Apr. 4, 2001

(65) Prior Publication Data

US 2002/0165859 A1 Nov. 7, 2002

(51) Int. Cl.$^7$ ............................................. G06F 17/30
(52) U.S. Cl. .............................. 707/5; 707/6; 707/101; 709/206; 705/7
(58) Field of Search ........................ 707/1–6, 10, 100, 707/101, 102, 501, 533; 709/202, 206; 706/20; 705/7, 8

(56) References Cited

U.S. PATENT DOCUMENTS

| | | | | |
|---|---|---|---|---|
| 5,930,762 A | * | 7/1999 | Masch | 705/7 |
| 5,933,822 A | * | 8/1999 | Braden-Harder et al. | 707/5 |
| 6,161,130 A | * | 12/2000 | Horvitz et al. | 709/206 |
| 6,173,279 B1 | * | 1/2001 | Levin et al. | 707/5 |
| 6,192,360 B1 | * | 2/2001 | Dumais et al. | 707/6 |
| 6,289,353 B1 | * | 9/2001 | Hazlehurst et al. | 707/102 |
| 6,408,300 B1 | * | 6/2002 | Bergman et al. | 707/101 |
| 6,453,246 B1 | * | 9/2002 | Agrafiotis et al. | 702/27 |

OTHER PUBLICATIONS

Komei Fukuda & Alain Prodon, "Double Description Method Revisited", pp. 1–22.

Benno Bueler, Andreas Enge & Komei Fukuda, "Exact Volume Computation For Polytopes", Jan. 12, 1998 revised Aug. 7, 1998, pp. 1–18.

J.B. Lasserre, An Analytical Expression and an Algorithm for the Volume of a Convex Polyhedron in $R^n$, Mar. 3, 1993, pp 363–377.

Christos H. Papadimitriou, Combinatorial Optimization: Algorithms and Complexity, pp. 27–66 and pp. 174–176.

* cited by examiner

*Primary Examiner*—Shahid Alam
(74) *Attorney, Agent, or Firm*—F. Chau & Associates, LLC

(57) ABSTRACT

A method is provided for ranking a plurality of items. The method comprises initializing a (D−1) dimensional weight space including a feasible region, where D is equal to a number of attributes and a point in the weight space corresponds to each attribute, determining an item pair, and querying a user to select an item from among the item pair. The method further includes reducing the feasible region based upon a user's item selection, and ranking the items according a ranking point in a reduced feasible region. The ranking point is a center of the reduced feasible region, wherein the center is one of a vertex barycenter and center of gravity. The ranking point corresponds to a users item selection. The method includes the step of selecting a plurality of hyperplanes, each hyperplane corresponding to an item pair such that the hyperplane divides the feasible region into two substantially equal portions.

19 Claims, 4 Drawing Sheets

METHOD OF RANKING ITEMS USING EFFICIENT QUERIES

BACKGROUND OF THE INVENTION

1. Field of the Invention

The present invention relates to ranking items and more particularly to a method for ranking items based on user preferences.

2. Discussion of the Prior Art

Ranking comparable items with multiple attributes based on user preferences is a task that is performed in various domains. For example, ranking bids received in response to a request for quotes in a marketplace. The ranking may be based on the user's notion of desirability for various attributes of goods or services. A value function may be formulated to combine the attributes of the goods or services.

Current proposed ranking methods describe user preferences in terms of values corresponding to attributes of an item. The proposed methods rank items based on comparisons of corresponding value functions. The choice of a value function may be done with or without interaction with the user. A choice may include a linear model for weighting the importance of a group of attributes. A ranking method then sums each attribute's weighted contribution to the value functions to compute an overall score for each item. The items are ranked based on the computed overall scores.

Another proposed method is provided by Perfect.com, embodied in the PerfectMarket (TM) product. A user is asked to specify weights for various item attributes in terms of relative importance. The system uses the explicitly specified weights to rank a group of items having the attributes. The method allowing the user to specify these weights explicitly is not easy or intuitive.

Active Research has a proposed method embodied in the Active Sales Assistant (TM) product. However, like other prior art methods, this method first queries the user about the desirability of various attributes. The method then iteratively queries the user to select a preferred item amongst a pair of synthetically generated items, the synthetic items including different subsets of the attributes. In the next step, the user is queried to provide other information about themselves before a final ranked list of items is determined. The multiple stages and types of queries in the method may be undesirable. The use of synthetic items in the pair wise ranking queries may not be desirable since it may give the user a false notion of what items are available. Displaying a small subset of the attributes with these synthetic items adds to the artificial ranking scenario used to gather the user preferences. In summary, this method is tedious and does not accurately capture user preferences.

Therefore, a need exists for a system and method of ranking items using efficient queries.

SUMMARY OF THE INVENTION

It is an object of this invention to provide a method of ranking items that uses intuitive queries to learn user preferences. It is an object of the present invention to be efficient with the queries while learning the user preferences accurately. It is an object of this invention to use actual items for comparisons so that accurate preferences may be determined by comparing item attributes simultaneously. It is an object of this invention to provide a ranking that is consistent with user responses to the queries; otherwise indicating to the user that a ranking not feasible.

According to an embodiment of the present invention, a method is provided for ranking a plurality of items. The method includes initializing a (D−1) dimensional weight space including a feasible region, where D is equal to a number of attributes and a point in the weight space corresponds to each attribute, reducing the feasible region based upon an item selection, and ranking the items according a ranking point in a reduced feasible region. The item selection can be provided by historical data. The ranking point is a center of the reduced feasible region.

The method includes determining a k-member set of items, and querying a user to select an item from among the k-member set. The method includes determining an additional query upon determining that the reduced feasible region includes at least one point. The method includes determining an additional query upon determining that a convergence is greater than a predefined minimum change, wherein the convergence is one of a change in the volume of the feasible region and the change in the position of the ranking point within the feasible region. A maximum number of queries is defined by a user.

Querying the user to select an item includes determining at least two portions of the feasible space, the portions defined by at least one hyperplane, each hyperplane defined by two items, and reducing the feasible region to the portion corresponding to the user selected item.

The k-member item set is an item pair. The item selection is between at least three items.

The method includes determining a hyperplane for each item pair within each item set, determining a volume for each portion of the feasible region as divided by each hyperplane, and selecting an item set, the largest portion of the selected item set including the smallest volume among the plurality of largest portions of each item set. The volume for each portion is the volume of a bounding box enclosing the portion.

According to an embodiment of the present invention, a program storage device is provided, readable by machine, tangibly embodying a program of instructions executable by the machine to perform method steps for ranking a plurality of items. The method includes initializing a (D−1) dimensional weight space including a feasible region, where D is equal to a number of attributes and a point in the weight space corresponds each attribute, reducing the feasible region based upon an item selection, and ranking the items according a ranking point in a reduced feasible region.

According to an embodiment of the present invention, a method is provided for ranking a plurality of items. The method comprises initializing a (D−1) dimensional weight space including a feasible region, where D is equal to a number of attributes and a point in the weight space corresponds to each attribute, determining an item pair, and querying a user to select an item from among the item pair. The method further includes reducing the feasible region based upon a user's item selection, and ranking the items according a ranking point in a reduced feasible region. The ranking point is a center of the reduced feasible region, wherein the center is one of a vertex barycenter and center of gravity.

The method includes determining an additional query upon determining that a convergence is greater than a predefined minimum change, wherein the convergence is one of a change in the volume of the feasible region and the change in the position of the ranking point within the feasible region. A maximum number of queries can be defined by a user.

The step of determining the item pair includes determining a volume for each portion of the feasible region as divided by a hyperplane defined by an item pair, for each item pair respectively, and selecting an item pair, the largest portion of the selected item pair including the smallest volume among the plurality of largest portions of each item pair. The volume for each portion is the volume of a bounding box enclosing the portion.

The method includes selecting a plurality of hyperplanes proximate to the center of the feasible region. Proximity is a function of a normal distance to the center of the feasible region.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
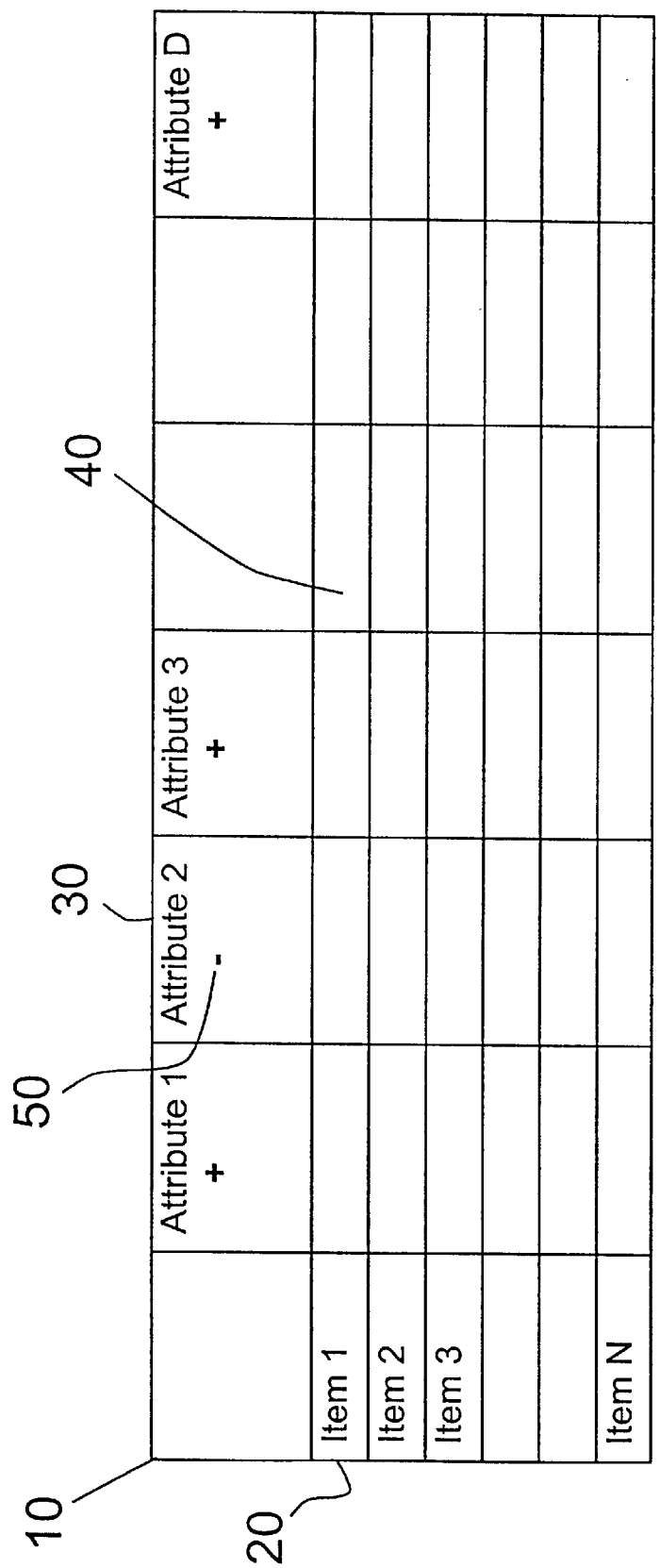
FIG. 1 depicts a table of items with values for each attribute according to an embodiment of the present invention.

The present invention proposes using an intuitive interface presenting a subset of actual items to a user and querying the user to pick the most desirable item from among the presented subset. Presenting pairs of items is a particularly effective and intuitive form of querying. The use of actual items with known attribute values captures user preferences accurately and does not give the user false notions about the available items. The items presented to the user in these iterative queries reduce the number of queries needed to generate the ranks. This is done by defining a (D−1) dimensional weight space, where D is equal to a number of attributes, including a feasible region that captures the weights for attributes that are consistent with the responses to the queries. The queries are chosen so as to iteratively divide the initial feasible region. This process results in an efficient set of queries and a final ranking that is consistent with the user responses.

By querying a user to choose between at least one pair of items, each pair defining a hyperplane that approximately bisects the current feasible region, the feasible region may be focused efficiently. For example, consider four user preferences, each preference reducing the feasible region roughly in half, after the forth user selection the feasible region is about $1/16^{th}$ of the size of the initial feasible region. This is an advantage of the present invention because a ranking can be generated using a relatively small number of queries as compared to the prior art methods.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Referring to FIG. 1, given a set of N comparable items described by D attributes, values are assigned to the attributes for each of the N items, as depicted in table 10. Each item 20 is represented by at least one attribute, each item corresponds to a row of attributes. For example, a group of available printers may form a set of items which may be ranked according to user preferences. Each attribute 30 corresponds to the set of items and forms a column in the table 10. The set of printers may have attributes including, for example, brand name, price, printer speed for black-and-white printing, and printer resolution. Attributes may be categorical (e.g., brand) or numeric (printer speed). A symbol 50 for each numeric attribute may indicate whether increasing (symbol+) or decreasing (symbol−) values are preferred for a particular attribute. Each cell, e.g., 40, in the table 10 may include a value for the corresponding attribute and corresponding item.

According to an embodiment of the present invention, the values for a particular attribute may be derived in different ways. Further, not all items correspond to each attribute, thus, a cell corresponding to a particular item may be empty for a particular attribute. For a categorical attribute, for example, brand name, the value may be derived by querying the user to place all the brand names on a linear scale according to desirability. According to an embodiment of the present invention, desirability includes any quality, fact, or degree of being desirable. It should also be noted that the present invention may use queries which illicit a user's least desirable preference. For a numeric attribute, for example, printer speed, the value may be derived using a transformation on the speed. Examples of a transformation include using an actual printer speed or using a logarithm of the actual speed. The value may also reflect whether increasing or decreasing values are preferable for a particular attribute. For example, for an attribute such as price, decreasing values may be preferable. This may be reflected by a symbol assigned to each attribute. It should be noted that attribute values are normalized, thus, attributes such as color and printing speed may be compared. Various methods of normalization may be used, and these methods would be obvious to one skilled in the art.

Figure 2:
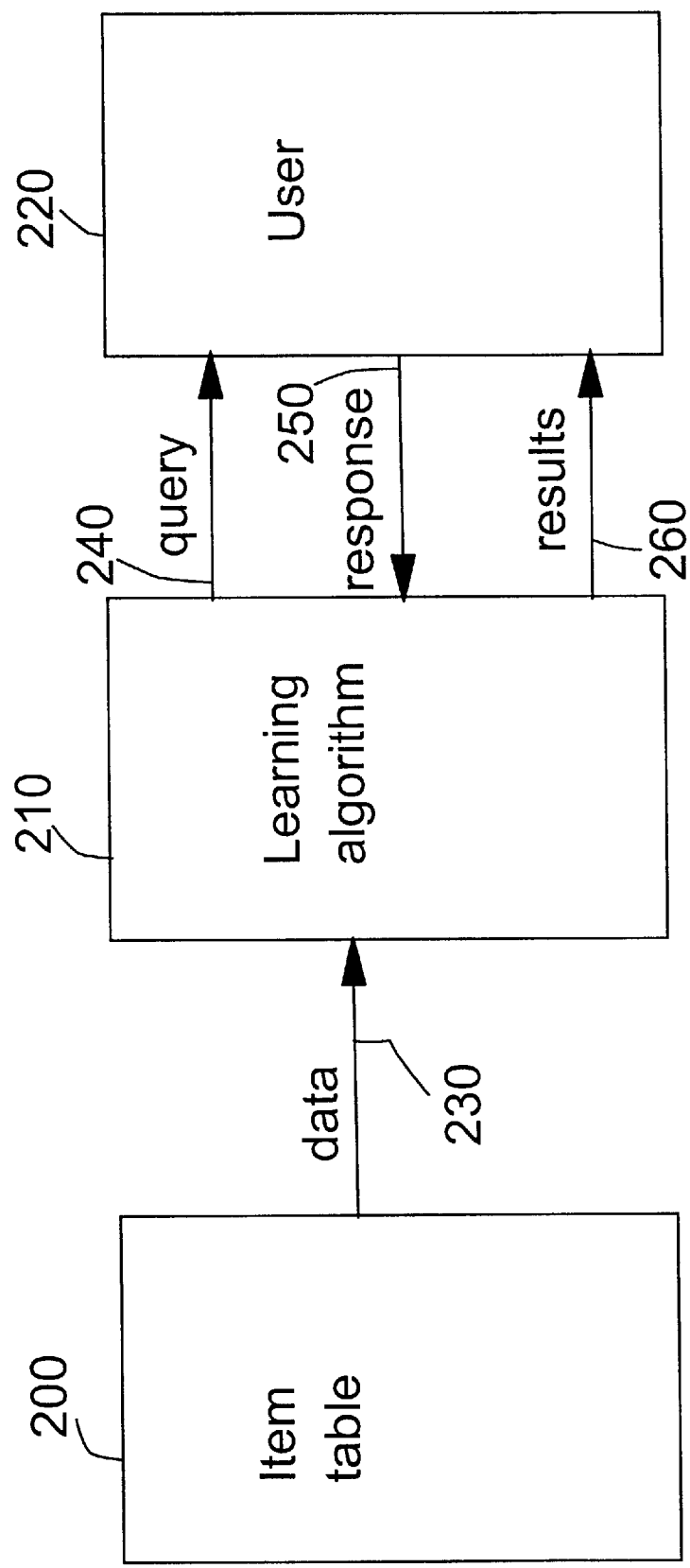
FIG. 2 shows a high level block diagram of the invention according to the present invention.

A high level view of the present invention is shown in FIG. 2. The item table described in FIG. 1 is depicted in block 200. A learning method 210 uses data 230 in the item table 200 and interacts with a user 220. The interactions with the user 220 include queries 240, responses 250, and a result 260. The method of interaction is iterative; the user 220 may be queried 240 several times before the method provides results 260 based on the responses 250.

Figure 3:
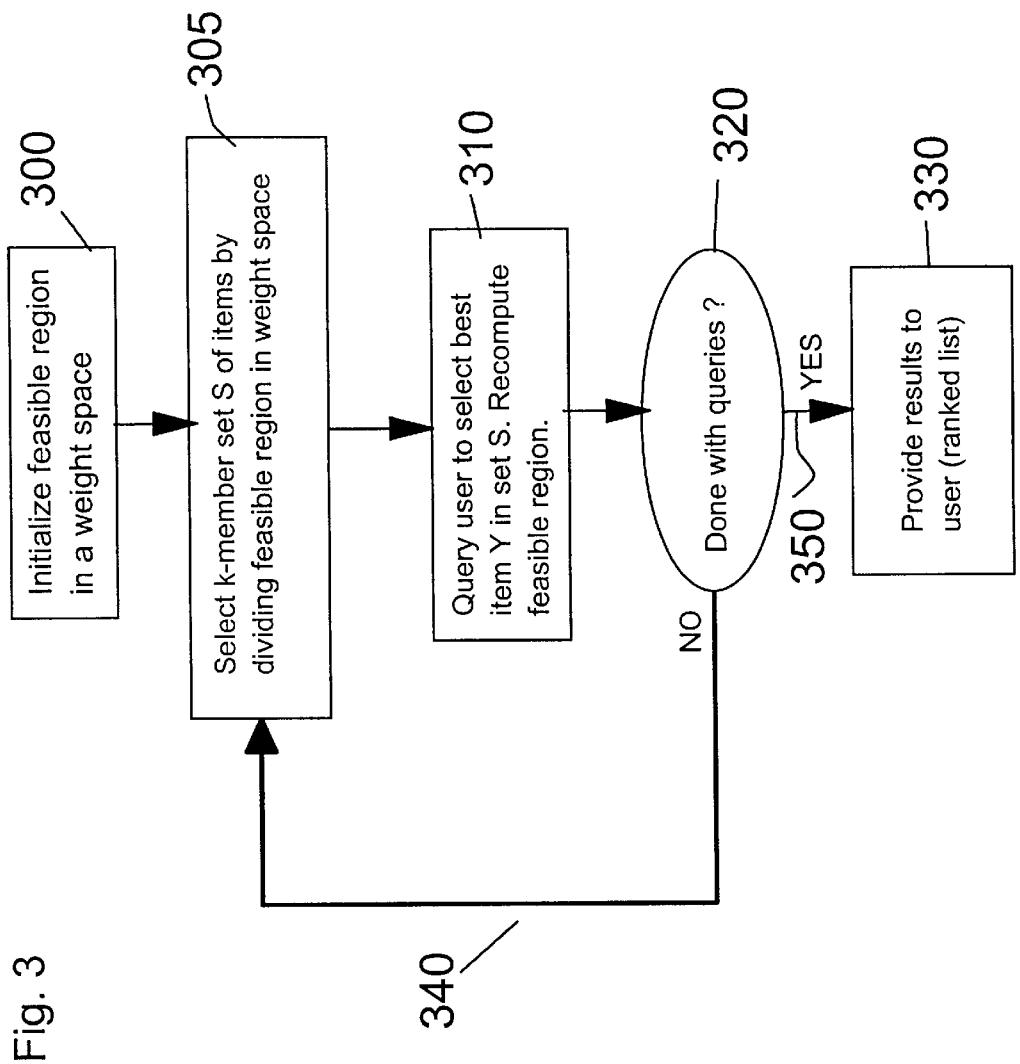
FIG. 3 is a flow diagram illustrating a method for presenting queries according to the present invention.

FIG. 3 shows a flow diagram describing the learning method 210 in FIG. 2. Block 300 initializes an (D−1) dimensional weight space having a feasible region. The feasible region includes all possible weights consistent with the user responses. Block 305 selects a k-member subset of items from an entire set of items. Block 310 queries the user to select the most desirable item Y in the subset and uses the response to re-determine the feasible region. Thus, given a user preference, the feasible region is reduced and a new ranked list is determined. Block 320 determines whether the method is finished with the queries using various criteria. If not, path 340 is taken to iterate the method starting at block 305. Upon finishing the queries, path 350 is taken to block 330 in which the results are provide to the user. The results are based on iterative limitation of the initial feasible region, the limitations imposed by the user preferences. The results may include a ranked list of items or another representation of the items corresponding to the values assigned to the attributes. For example, the present invention may present the feasible region as an intermediate solution which relates information about individual attributes to a user.

According to an embodiment of the present invention, the method may query the user to remove irrelevant attributes in the item table from consideration prior to block 300. This block may not be needed if all the attributes given in the items table are relevant for the ranking.

According to an embodiment of the present invention, a set of attribute weights are considered, which represent the relative desirability of the D attributes that characterize the items. For an items table with D relevant attributes, a weight space with dimensionality (D−1) is constructed by excluding any one of the attribute weights. The excluded attribute weight can be determined from the (D−1) attributes by using the property that the sum of the D weights is 1. However, it should be noted that the weight space may be defined to have other dimensionalities, for example, D as opposed to D−1, without departing from the scope or spirit of the present invention.

The initial feasible region in the (D−1) dimensional weight space is defined by the following constraints. Each of the (D−1) weights is within the interval [0,1] and the sum of the (D−1) weights cannot exceed 1. Additional constraints may be added to the definition of the initial feasible region. For example, when there are no interactive queries but there is historical data for prior rankings of items in the same domain. According to an embodiment of the present invention, a method of determining constraints may adapt previously ranked items in the same domain. For example, the user may have already specified the most desirable item A in a set of items E. This implies that item A is preferred when compared to any other item B in set E. Thus, the initial feasible region may be limited by historical data.

According to an embodiment of the present invention, for the additional constraint generated from the preference of A over B, let the values for the attributes for item A be $\{aj\}$ for each attribute j in the range 1 to D; let the values for the attributes for item B be $\{bj\}$ for each attribute j in the range 1 to D; and attributes with missing values for either item A or B are ignored. The additional constraint is $\Sigma(aj \times wj) > \Sigma(bj \times wj)$, where wj is the weight corresponding to attribute j, for j from 1 to D. This constraint may be translated to the (D−1) weight space where the sum of D weights is 1. Thus, the weight for the excluded attribute in the (D−1) weight space can be replaced by 1 minus the sum of the included weights. The constraint resulting from the comparison of two items can be represented in terms of a corresponding hyperplane in the (D−1) weight space. For example, let the excluded attribute from the (D−1) weight space be the Dth attribute. The hyperplane corresponding to the comparison between items A and B can be represented by the equation $$\Sigma(wj \times [(aj-aD)-(bj-bD)]) + (aD-bD) = 0, \text{ for } j \text{ from 1 to}(D-1).$$

The corresponding hyperplane cuts the feasible region in the (D−1) dimensional weight space into at most two parts. The constraint specifies which part the solution should be in. Thus there is a correspondence between comparing a pair of items and a hyperplane.

The method may use any value for k. For example, where k is equal to 2, a pair of items in each subset will be selected in block 305. For each pair of items, block 310 queries the user to select the most desirable item Y from a pair. Alternatively, block 310 may allow the user response to indicate that both items in the pair are equally desirable. In a preferred embodiment the user must choose an item from the pair as the preferred item. For the case where k=2, an embodiment of block 305 is given in FIG. 4.

Figure 4:
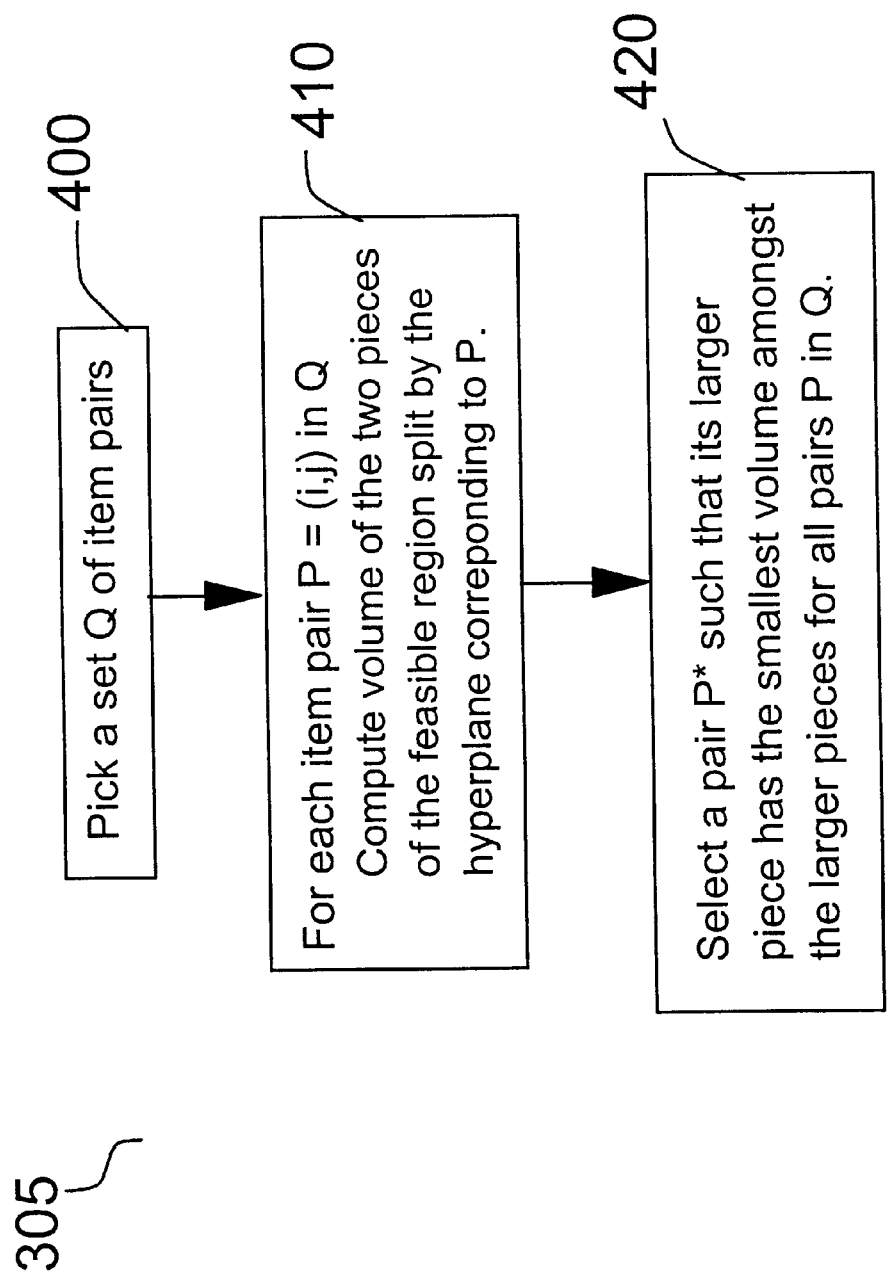
FIG. 4 is a flow diagram illustrating a method which selects an item pair by dividing a feasible region according to an embodiment of the present invention.

Referring to FIG. 4, a feasible region may be divided according to user preferences. In block 400 a set of item pairs Q is selected for analysis where k is equal to 2. Consider the set of item pairs Q. In a preferred embodiment Q is restricted to include only those item pairs that include two of the top m items in the current rankings, where m is a user chosen number. The current rankings reflect each item's desirability based on the current user preferences. Item pairs chosen in block 420 of the prior iteration are removed from Q. For each item pair in Q, determine a normal distance of a corresponding hyperplane from the center of the current feasible region. Various choices may be used for the center of the feasible region including the vertex barycenter or the center of gravity of the feasible region. The item pairs are sorted in order of increasing normal distance from the center of the current feasible region. A user selected number of the closest item pairs are included in Q, for example, the four item pairs closest to the center of the current feasible region. An alternative method of determining Q is to include all item pairs.

If the current center of the feasible region is (v1,v2, ... ) in the (D−1) dimensional weight space, then the normal distance from the center to a hyperplane defined by the equation $\Sigma(gj \times wj) + h = 0$ is given by taking the absolute value of $$\frac{\sum (gj \times vj) + h}{\sqrt{\sum (gj \times gj)}}$$

where all the summations are for j from 1 to (D−1). The vertex barycenter is the average of the coordinates of all the vertices or extreme points of the region. The center of gravity for the feasible region is where all the mass of the region can be assumed to be concentrated if the region is filled uniformly with matter.

Specifically, in block 410, each item pair P in the set Q is considered. The volume for each piece of the feasible region divided by the hyperplane corresponding to item pair P is determined. Volume can be computed in many ways. According to an embodiment of the present invention, the volume of a bounding box within the feasible region is determined. The bounding box has two sides for each attribute and encloses the feasible region. For example, within a three dimensional space, the bounding box includes six sides enclosing the feasible region, two sides per attribute. The bounding box volume can be determined according to the range of values for vertices of the feasible region for each attribute and determining the bounding box volume as the product of the bounding box sizes for each of the attributes. The bounding box volume can also be determined by using linear programming (See: Combinatorial Optimization, Algorithms and Complexity, C. Papadimitriou and K. Steiglitz, Prentice Hall, 1982, pages 27–66 and 174–177, incorporated by reference herein in its entirety) to determine the ranges of values for the region in each dimension. Another alternative for volume computation is to use the method proposed in J. B. Lassere, "An analytical expression and an method for the volume of a convex polyhedron in $R^m$", in Journal of Optimization Theory and Applications, 39(3), 1983, pages 363–377. Other alternatives for volume computation are described in B. Beuler, A. Enge and K. Fukuda, "Exact Volume Computation for Polytopes: A Practical study", in Abstracts of the 12th European Workshop on Computational Geometry, Munster 1996, pages 57–64. Other approximations of the volume, such as the volume of an inscribed ellipsoid, volume of an enclosing ellipsoid, and randomized methods for estimating volume can also be used. Affine transformations (refer Combinational Optimization: Algorithms and Complexity, by C. Papadimitriou and Steiglitz, Prentice Hall, 1982, Chapter 8, Section 8.7.2, Pages 174–176) can be applied when needed to the region which make the region more rounded before the volume computation methods are applied. Volumes can be computed for the transformed region and then translated back to correspond to the original region.

In block 420, the volumes of the larger pieces generated by the division of the feasible region by each pair P in Q are compared. A pair P* is selected, whose largest piece has the smallest volume from among the larger pieces.

Referring to FIG. 3, block 305, for k greater than 2, consider all the possible k-member subsets of items that have not been considered before. For each k-member subset T, determine the worst case volume of the region that would remain if T was used in the query to the user in block 310. This can be determined as follows: consider the case where an item u in T would be selected as the best in T. There are k such cases since T has k items. Choosing an item u in T implies that u is better than every other item in T. As discussed earlier for the k=2 case, this results in one constraint for each of the other items in T. Thus, for each case of choosing u as the item in T, the resulting constraints can be used to calculate the volume of the feasible region that would remain if all the (k−1) constraints were satisfied. The largest remaining volume among all the k cases of the best possible item in T is used as the worst case volume of the region that would remain if T was selected in block 305. The k-member subset T with the smallest worst case volume is chosen in block 305.

Referring to FIG. 3, in block 310, the chosen k-member subset is presented to the user and the user is queried to select the most desirable item Y in the subset. This implies that item Y is preferred when compared to any other item Z in the subset. For each item, Z, an additional constraint may be generated to redefine the feasible region as described next. Let the values for the attributes for item Y be $\{y_j\}$ for each attribute j in the range 1 to D. Let the values for the attributes for item Z be $\{z_j\}$ for each attribute j in the range 1 to D. Attributes with missing values for either item Y or item Z are ignored. The additional constraint is $\Sigma(y_j \times w_j) > \Sigma(z_j \times w_j)$, where $w_j$ is the weight corresponding to attribute j. The additional constraint can be translated to the (D−1) weight space by using the property that the sum of D weights is 1 and so the weight for the excluded attribute in the (D−1) weight space can be replaced by 1 minus the sum of the other weights. The feasible region is recomputed after all the additional constraints have been generated. The center of the feasible region is computed. As mentioned earlier the center can be defined in various ways.

According to an embodiment of the present invention, the vertex barycenter is used, which includes the vertices of the feasible region and the mean values for all the (D−1) attribute dimensions computed as the vertex barycenter. The vertices of the feasible region can be computed by various methods. One method is described by K. Fukuda and A. Prodon, "Double description method revisited. In Combinatorics and Computer Science", volume 1120 of Lecture Notes in Computer Science, pages 91–111. Springer, 1996. In one embodiment, the center is chosen so that it minimizes the sum of the square of the normal distances to all the irredundant (relevant) hyperplanes of the feasible region. Other alternatives for the center include the center of gravity of the region, and the analytic center of the region. In one embodiment of the present invention, the center is chosen to maximize the sum of the logarithm of the normal distances to all the irredundant hyperplanes of the feasible region.

In block 320, the method determines whether more queries are needed. This can be done using various criteria. If the feasible region is empty, because the constraints defining the feasible region cannot be satisfied (e.g., because of inconsistencies in user preferences), then further queries are not needed. The test for an empty region can be done using various linear programming methods. An exact volume computation method may also be used to test for an empty region. One criterion for determining whether additional queries are needed is based on detecting the convergence of the feasible region. Convergence can be determined based on successive volumes of the feasible region or the movement of successive centers of the feasible region. A user specified limit on the maximum number of queries may also be used to determine whether additional queries are needed. If more queries are needed the iterative process returns to block 305 and the process repeats as described earlier. If no more queries are needed then the process proceeds to block 330.

In block 330, the results of the analysis are provided to the user. If the feasible region is empty then the results indicate that the users responses to the queries do not conform to the model developed by the method with the data being provided. For other cases, the responses from the user are used to generate a ranked list of items. According to an embodiment of the present invention, the list is generating by determining a set of weights consistent with the final feasible region derived by the iterative division of the initial feasible region. In the (D−1) weight space, any point C in the feasible region may be chosen for this purpose. A set of D weights is determined by calculating the weight for the excluded attribute, as 1 minus the sum of the weights for the attributes in the (D−1) space, as determined by the value in each dimension for the point or weight C. According to an embodiment of the present invention, a center of the feasible region may be chosen as the point C. Any of the notions of the center discussed earlier may be used. The D weights are used to calculate a ranking score for each item using the formula score=$\Sigma(y_j \times w_j)$, where $y_j$ is the value for attribute j for this item, and $w_j$ is the weight of attribute j in the determined set of weights. The list of items is sorted in decreasing order of the ranking values and provided to the user. Optionally the attribute weights and the computed ranking values for the items can also be provided to the user.

Having described embodiments of a system and method for ranking items using queries, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set forth in the appended claims.

What is claimed is:

1. A method for ranking a plurality of items comprising the steps of:
    initializing a (D−1) dimensional weight space including a feasible region, where D is equal to a number of attributes and a point in the weight space corresponds to each attribute;
    reducing the feasible region based upon an item selection from a k-member set of items, wherein each item is represented by at least one attribute;
    ranking the items according to a ranking point in a reduced feasible region;
    determining a hyperplane for each of at least one k-member set of items of an item set;
    determining a volume for each portion of the feasible region as divided by each hyperplane; and
    selecting the k-member set of items, the largest portion of the feasible region as divided by a hyperplane corresponding to the selected k-member set of items including the smallest volume among the plurality of largest portions corresponding to each of the at least one k-member set of items.

2. The method of claim 1, wherein the item selection is provided by historical data.

3. The method of claim 1, wherein the ranking point is a center of the reduced feasible region.

4. The method of claim 1, further comprising the steps of:
    determining a k-member set of items; and
    querying a user to select an item from among the k-member set.

5. The method of claim 4, further comprising the step of determining an additional query upon determining that the reduced feasible region includes at least one point.

6. The method of claim 5, wherein a maximum number of queries is defined by a user.

7. The method of claim 5, wherein the step of querying the user to select an item further comprises:
    determining at least two portions of the feasible space, the portions defined by at least one hyperplane, each hyperplane defined by two items; and
    reducing the feasible region to the portion corresponding to the user selected item.

8. The method of claim 4, further comprising the step of determining an additional query upon determining that a convergence is greater than a predefined minimum change, wherein the convergence is one of a change in the volume of the feasible region and the change in the position of the ranking point in the feasible region.

9. The method of claim 1, wherein the k-member item set is an item pair.

10. The method of claim 1, wherein the item selection is between at least three items.

11. The method of claim 1, wherein the volume for each portion is the volume of a bounding box enclosing the portion.

12. A program storage device readable by machine, tangibly embodying a program of instructions executable by the machine to perform steps for ranking a plurality of items, the method steps comprising:
    initializing a (D−1) dimensional weight space including a feasible region, where D is equal to a number of attributes and a point in the weight space corresponds to each attribute;
    reducing the feasible region based upon an item selection from a k-member set of items, wherein each item is represented by at least one attribute;
    ranking the items according to a ranking point in a reduced feasible region;
    determining a hyperplane for each of at least one k-member set of items of an item set;
    determining a volume for each portion of the feasible region as divided by each hyperplane; and
    selecting the k-member set of items, the largest portion of the feasible region as divided by a hyperplane corresponding to the selected k-member set of items including the smallest volume among the plurality of largest portions corresponding to each of the at least one member set of items.

13. A method for ranking a plurality of items comprising the steps of:
    initializing a (D−1) dimensional weight space including a feasible region, where D is equal to a number of attributes and a point in the weight space corresponds to each attribute;
    determining an item pair;
    querying a user to select an item from among the item pair, wherein each item is represented by at least one attribute;
    reducing the feasible region based upon a user's item selection;
    ranking the items according to a ranking point in a reduced feasible region;
    determining a volume for each portion of the feasible region as divided by a hyperplane defined by an item pair, for each item pair respectively; and
    selecting an item pair, the largest portion of the selected item pair including the smallest volume among the plurality of largest portions of each item pair.

14. The method of claim 13, wherein the ranking point is a center of the reduced feasible region, wherein the center is one of a vertex barycenter and center of gravity.

15. The method of claim 13, further comprising the step of determining an additional query upon determining that a convergence is greater than a predefined minimum change, wherein the convergence is one of a change in the volume of the feasible region and the change in the position of the ranking point in the feasible region.

16. The method of claim 13 wherein a maximum number of queries is defined by a user.

17. The method of claim 13, wherein the volume for each portion is the volume of a bounding box enclosing the portion.

18. The method of claim 13, further comprising the step of selecting a plurality of hyperplanes proximate to the center of the feasible region.

19. The method of claim 18, wherein proximity is a function of a normal distance to the center of the feasible region.

* * * * *